United States Patent
Kim et al.

(10) Patent No.: US 10,494,265 B2
(45) Date of Patent: *Dec. 3, 2019

(54) METHOD FOR PRODUCING SILICA AEROGEL AND SILICA AEROGEL PRODUCED THEREBY

(71) Applicant: LG CHEM, LTD., Seoul (KR)

(72) Inventors: Young Hun Kim, Daejeon (KR); Je Kyun Lee, Daejeon (KR)

(73) Assignee: LG CHEM, LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/768,999

(22) PCT Filed: Sep. 6, 2017

(86) PCT No.: PCT/KR2017/009768
§ 371 (c)(1),
(2) Date: Apr. 17, 2018

(87) PCT Pub. No.: WO2018/048197
PCT Pub. Date: Mar. 15, 2018

(65) Prior Publication Data
US 2019/0062169 A1    Feb. 28, 2019

(30) Foreign Application Priority Data
Sep. 12, 2016   (KR) .................. 10-2016-0117521

(51) Int. Cl.
*C01B 33/158*    (2006.01)
*B01J 13/00*    (2006.01)
(Continued)

(52) U.S. Cl.
CPC ....... *C01B 33/1585* (2013.01); *B01J 13/0056* (2013.01); *B01J 13/0082* (2013.01);
(Continued)

(58) Field of Classification Search
CPC .............. C01B 33/1585; B01J 13/0056; B01J 13/0082; B01J 13/0091
See application file for complete search history.

(56) References Cited

U.S. PATENT DOCUMENTS 4,148,864 A    4/1979  Groth et al.
2008/0034968 A1  2/2008  Nordberg et al.
(Continued)

FOREIGN PATENT DOCUMENTS

EP    2927194    10/2015
EP    2930147    10/2015
(Continued)

*Primary Examiner* — Melvin C. Mayes
*Assistant Examiner* — Michael Forrest
(74) *Attorney, Agent, or Firm* — Dentons US LLP

(57) ABSTRACT

The present invention relates to a method for producing a silica aerogel and a silica aerogel produced thereby. More specifically, a first water glass solution is used to form a first silica wet gel, and then a second water glass solution is additionally added to form a second silica wet gel organically bonded to the first silica wet gel which serves as a basic skeleton, so that a silica aerogel with enhanced physical properties is formed to increase the resistance to shrinkage in ambient drying, and the concentration of silicon dioxide in each of the first and second water glass solutions is controlled, thereby providing a method for producing a silica aerogel by which a silica aerogel having a specific tap density and controllable density can be produced, and also providing a silicon aerogel produced by the method.

13 Claims, 1 Drawing Sheet

(51) Int. Cl.
*C01B 33/154* (2006.01)
*C01B 33/32* (2006.01)

(52) U.S. Cl.
CPC ....... *B01J 13/0091* (2013.01); *C01B 33/1546* (2013.01); *C01B 33/325* (2013.01); *C01P 2006/11* (2013.01)

(56) References Cited

U.S. PATENT DOCUMENTS

| | | |
|---|---|---|
| 2011/0000370 A1 | 1/2011 | Norberg et al. |
| 2015/0225630 A1 | 8/2015 | Hosoi et al. |
| 2016/0264427 A1* | 9/2016 | Oh .......................... C01B 33/16 |
| 2016/0280557 A1 | 9/2016 | Kim et al. |
| 2018/0305215 A1* | 10/2018 | Kim ...................... C01B 33/157 |

FOREIGN PATENT DOCUMENTS

| | | |
|---|---|---|
| JP | 2014051643 | 3/2014 |
| KR | 10-2014-0146814 | 12/2014 |
| KR | 10-2015-0093122 | 8/2015 |
| KR | 10-2015-0093123 | 8/2015 |
| WO | 1992020623 | 11/1992 |

* cited by examiner

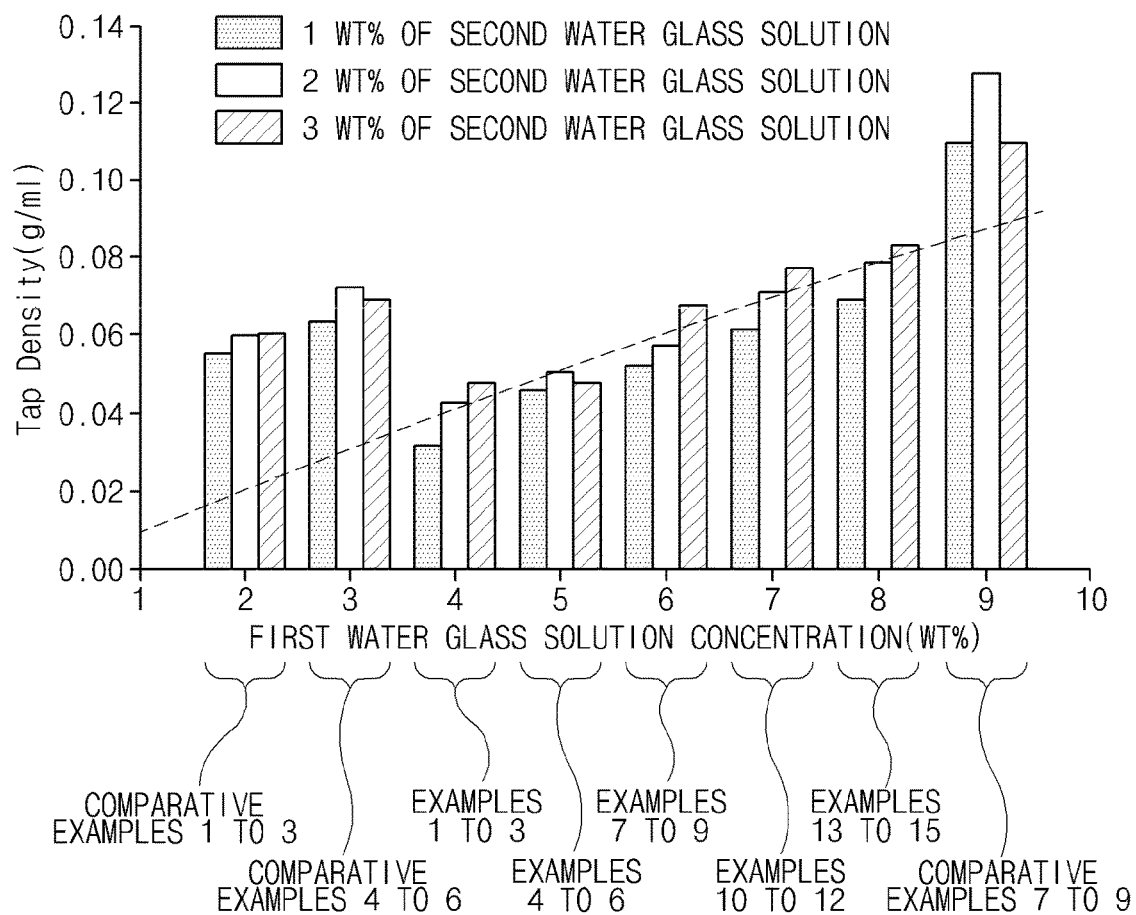

METHOD FOR PRODUCING SILICA AEROGEL AND SILICA AEROGEL PRODUCED THEREBY

CROSS-REFERENCE TO RELATED APPLICATIONS

This application is a National Stage Application of International Application No. PCT/KR2017/009768 filed on Sep. 6, 2017, which claims priority to and the benefit of Korean Patent Application No. 10-2016-0117521, filed on Sep. 12, 2016, in the Korean Intellectual Property Office, both of which are incorporated herein in their its entirety by reference for all purposes as if fully set forth herein.

TECHNICAL FIELD

The present invention relates to a method for producing a silica aerogel the density of which is controllable, and a silica aerogel produced thereby.

BACKGROUND ART

An aerogel is a superporous, high specific surface area (500 m$^2$/g) material having a porosity of about 90 to 99.9% and a pore size in the range of 1 to 100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively studied.

The biggest advantage of the aerogel is that the aerogel has a super-insulation exhibiting a thermal conductivity of 0.300 W/m·K or less, which is lower than that of an organic insulation material such as conventional Styrofoam, and that fire vulnerability and the occurrence of harmful gases in case of fire which are fatal weaknesses of the organic insulation material can be solved.

In general, the aerogel is produced by preparing a hydrogel from a silica precursor such as water glass and alkoxysilane series (TEOS, TMOS, MTMS, etc.), and removing a liquid component inside the hydrogel without destroying a microstructure. The typical form of a silica aerogel may be classified into three types, i.e., powder, granule, and monolith, and the silica aerogel is generally produced in the form of powder.

Meanwhile, when the silica aerogel absorbs moisture, the characteristics and physical properties of a gel structure are deteriorated. Therefore, in order to easily use the silica aerogel in industries, a method which is capable of permanently preventing moisture in the air from being absorbed is required. Accordingly, methods for producing a silica aerogel having permanent hydrophobicity by hydrophobizing the surface thereof have been proposed.

Accordingly, the silica aerogel is generally produced by a sol-gel method in which sol formation, hydrogel formation, aging, solvent exchange, surface modification, and drying are carried out. However, the sol-gel method requires a very complicated process and requires much cost and time, thus deteriorating the productivity and economical efficiency of the silica aerogel. Therefore, the development of a novel method for producing a silica aerogel having better physical properties by a simpler process is required.

In addition, when an ambient drying technique is used to ensure price competitiveness, a pore structure is shrunk due to a high capillary force. Thus, it is difficult to predict a tap density of the finally produced silica aerogel, and also difficult to produce the silica aerogel according to the desired specific tap density. Therefore, it is necessary to develop a method for producing a silica aerogel the density of which is controllable.

PRIOR ART DOCUMENT

[Patent Document 1]
Korean Patent Application Publication No. 10-2015-0093123 (published on Aug. 17, 2015)

DISCLOSURE OF THE INVENTION

Technical Problem

An aspect of the present invention provides a method for producing a silica aerogel the density of which is controllable, wherein the method provides excellent productivity and economical efficiency due to a simple production process, and is capable of forming a silica aerogel having enhanced mechanical properties to increase the resistance to shrinkage during ambient drying, thereby forming a low-density silica aerogel, and is also capable of controlling the concentration of silicon dioxide in first and second water glass solutions to produce a silica aerogel having a specific tap density.

Another aspect of the present invention provides a density-controlled silica aerogel produced by the above-described method.

Technical Solution

According to an aspect of the present invention, there is provided a method for preparing a silica aerogel including the steps of 1) adding a first water glass solution and an acid catalyst to a reactor to form a first silica wet gel; 2) adding a second water glass solution and the acid catalyst to the first silica wet gel; 3) adding a surface modifier solution to the first silica wet gel to form a second silica wet gel; and 4) drying a silica wet gel including the first silica wet gel and the second silica wet gel, wherein the concentration of silicon dioxide in the first water glass solution is 3.5 to 8.5 wt %, and the concentration of silicon dioxide in the second water glass solution is 0.5 to 3.5 wt %.

According to another aspect of the present invention, there is provided a silica aerogel produced by the above-described method.

Advantageous Effects

In a method for producing a silica aerogel according to the present invention, gelation, solvent exchange, and surface modification may be simultaneously performed during a single step, and thus the production time is shortened to provide excellent productivity and economical efficiency.

In addition, a first silica wet gel is first formed, and thereafter the first silica wet gel is used as a basic skeleton to which a second silica wet gel is then organically bonded, thereby forming a silica aerogel having enhanced mechanical properties. Accordingly, the resistance to shrinkage in ambient drying may be increased to form a silica aerogel having a low density.

Furthermore, a silica aerogel having a specific tap density may be produced by adjusting the concentration of silicon dioxide in first and second water glass solutions, so that there is an effect in that the tap density of the finally produced silica aerogel may be predicted.

BRIEF DESCRIPTION OF THE DRAWINGS

The following drawings attached herein illustrate preferred examples of the present invention by example, and serve to enable technical concepts of the present invention to be further understood together with detailed description of the invention given below, and therefore the present invention should not be interpreted only with matters in such drawings.

FIG. 1 is a graph showing a measured tap density of a silica aerogel produced according to examples and comparative examples of the present invention.

MODE FOR CARRYING OUT THE INVENTION

Hereinafter, the present invention will be described in more detail to allow for a clearer understanding of the present invention. In this case, it will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A silica wet gel produced by using water glass is shaped such that pores thereof are filled with water which is a solvent. Simply drying and removing the solvent, causes a pore structure to easily shrink and crack due to a solvent extraction rate difference and a capillary force caused by a high surface tension of water at the gas/liquid interface while the solvent in a liquid phase is vaporized to a gas phase. This leads to a reduction in surface area and a change in pore structure. Thus, in order to maintain the pore structure of the wet gel, it is necessary to exchange water having a relatively high surface tension with an organic solvent having a relatively low surface tension, and also a technique is required which is capable of washing and drying the wet gel without shrinkage while maintaining the structure of the wet gel without any change.

In addition, the dried silica aerogel maintains a low thermal conductivity just after drying, but absorbs water in the air due to the hydrophilicity of a silanol group (Si—OH) on the silica surface, so that there is a disadvantage that the nanopore structure is shrunk due to the condensation reaction of the silanol group, and the thermal conductivity gradually increases. Therefore, in order to maintain a low thermal conductivity, the surface of the silica aerogel needs to be modified to have a hydrophobicity. Accordingly, a method for modifying the surface of the silica aerogel so as to have a hydrophobicity by using a surface modifier is widely used. However, there is a problem in that a high unit price of the surface modifier and a difficulty in controlling the surface modification reaction result in poor productivity.

In general, a drying technique for removing a solvent while maintaining the pore structure of a wet gel without any change, and a technique for mass-producing a silica aerogel economically are most essential in production of the silica aerogel.

Accordingly, the present invention provides a method for producing a silica aerogel, which is excellent in productivity and economical efficiency for mass production, and in which the mechanical properties of the silica aerogel may be enhanced to prevent shrinkage of the pore structure, thereby controlling the tap density of the finally produced silica aerogel.

Hereinafter, a method for producing a silica aerogel according to an embodiment of the present invention will be described in detail.

A method for producing a silica aerogel according to an embodiment of the present invention includes: 1) adding a first water glass solution and an acid catalyst to the reactor to form a first silica wet gel; 2) adding a second water glass solution and the acid catalyst to the first silica wet gel; 3) adding a surface modifier solution to the first silica wet gel to form a second silica wet gel; and 4) drying a silica wet gel including the first silica wet gel and the second silica wet gel, wherein the concentration of silicon dioxide in the first water glass solution is 3.5 to 8.5 wt %, and the concentration of silicon dioxide in the second water glass solution is 0.5 to 3.5 wt %.

Step 1) according to an embodiment of the present invention is a step of forming the first silica wet gel, and may be specifically a step of adding an acid catalyst to the first water glass solution in the reactor to cause a reaction under the condition that the acidity (pH) is in the range of 4 to 7.

Here, the reaction may indicate a sol-gel reaction, and the sol-gel reaction may allow a network structure to be formed from a silica precursor material. Also, the network structure may be a planar mesh structure in which specific polygons having one or more types of atomic arrangement are linked to each other, or a structure in which specific polyhedrons share their vertices, edges, faces, etc., with each other to form a three dimensional skeleton structure.

The first silica wet gel may serve as not only a basic skeleton of the silica aerogel to be finally obtained by the production method of the present invention and but also a silica structure that functions as the frame of the network structure. The present invention may provide a mechanically more stable silica aerogel by organically bonding the second silica wet gel to the first wet gel which serves as the basic skeleton. Thus, the resultant silica aerogel may have more improved resistance to the shrinkage of the pores during a drying process, so that the density thereof may be controlled effectively.

The first water glass solution may be a diluted solution which is a mixture obtained by adding distilled water to water glass, and the water glass may be sodium silicate ($Na_2SiO_3$), which is an alkali silicate salt obtained by meting silicon dioxide ($SiO_2$) and alkali.

The acid catalyst may serve to promote a reaction environment such that the reaction (sol-gel reaction) may proceed readily. For example, the acid catalyst may control the reaction environment such that the acidity (pH) reaches the above-described range.

The acid catalyst may be added in an amount such that the molar ratio of the acid catalyst to the silicon dioxide in the first water glass solution may be 0.2 to 1.5, more specifically 0.5 to 1, or may be added in an amount such that the acidity (pH) reaches the above-described range.

The acid catalyst is not particularly limited to, but may be, for example, at least one selected from the group consisting of hydrochloride acid, nitric acid, acetic acid, sulfuric acid and hydrofluoric acid, and more specifically acetic acid.

A production method according to an embodiment of the present invention may further include performing a step of aging the first silica wet gel produced after the reaction of step 1).

The aging may be a step in which the silica wet gel is left standing for 1 hour to 10 hours at 50 to 90° C. According to the production method of the present invention, the network structure inside the first silica wet gel may be formed more firmly by subjecting to the aging after the preparation of the first silica wet gel, so that the first silica wet gel may be optimized to serve as a basic skeleton having enhanced mechanical stability.

In addition, a step of pulverizing the aged first silica wet gel may be further performed. The further pulverizing is to allow the second water glass solution to be better mixed and reacted with the first silica wet gel.

Step 2) according to an embodiment of the present invention may be a preparation step of forming the second silica wet gel. Specifically, an acid catalyst and a second water glass solution which is a precursor of the second silica wet gel are added to the prepared first silica wet gel, and the resultant mixture is stirred to produce a solution in which the first silica wet gel is dispersed.

In order to produce a silica aerogel the density of which is controllable, according to the present invention, it should be necessary to increase the resistance to the shrinkage of the pore structure during drying, by first preparing the first silica wet gel which serves as a basic skeleton, and then organically bonding the second silica wet gel to the first silica wet gel to form a mechanically more stable silica wet gel. For this reason, the concentration ratio between the first and second water glass solutions, which are silica precursors of the first and second wet gels, is necessary to be adjusted to an appropriate range.

Therefore, the first water glass solution may contain 3.5-8.5 wt % of silicon dioxide. When silicon dioxide in the first water glass solution is contained in an amount lower than the above range, the first silica wet gel serving as the basic skeleton of the silica aerogel of the present invention may not be properly formed to deteriorate mechanical and structural stability; and when the silicon dioxide is contained in an amount higher than the above range, the specific surface area of the produced first silica wet gel may be excessively lowered and the density may be greatly increased.

In addition, the second water glass solution may contain 0.5-3.5 wt % of silicon dioxide. When silicon dioxide in the second water glass solution is contained in an amount lower or higher than the above range, the density of the present invention falls outside a controllable range and the density of the finally produced silica aerogel is difficult to predict, so that the desired effect of the present invention may not be obtained.

As shown in FIG. 1, when the first and second water glass solutions having the specific concentrations are used in the present invention, a silica aerogel having a tap density of 0.03 to 0.10 g/ml, more specifically 0.04 to 0.08 g/ml may be produced. It can be understood that the error range in this case is 10%.

That is, in the production method of the present invention, the concentration of silicon dioxide in each of the first and second water glass solutions may be adjusted to a specific range, thereby producing a silica aerogel having a linear relationship between the concentration of the silicon dioxide in each of the first and second water glass solutions and the tap density of the finally produced silica aerogel.

In other words, the present invention uses the first and second water glass solutions having a specific water glass concentration, thereby stabilizing the mechanical properties of the obtained silica wet gel to increase the resistance to shrinkage that may be caused during a drying process. Thus, the tap density of the finally produced silica aerogel may be predicted and thus a silica aerogel in accordance with the intended specific tap density may be produced.

Therefore, in the present invention, the concentration ratio of silicon dioxide in the first water glass solution to that in the second water glass solution may be adjusted 1:1 to 10:1. When the concentration of the second water glass solution is lower than the above range, structural strength may be weak to increase the tap density due to shrinkage of pores in a drying process; and when the concentration of the second water glass solution is higher than the above range, the ratio of the first silica wet gel which serves as a basic skeleton is lowered, thus making it difficult to form a mechanically more stable structure. As a result, the tap density of the finally produced silica aerogel may be difficult to be predicted.

The acid catalyst added in step 2) according to an embodiment of the present invention may react with a surface modifier in the surface modifier solution to be described later to serve to activate the decomposition of the surface modifier. Accordingly, surface modification reaction may be improved, and gelation may be induced by increasing the pH with the acceleration of ammonia production. The acid catalyst added in step 2) is not particularly limited, and may be the same as or different from the acid catalyst added in step 1). Specifically, the acid catalyst added in step 2) may be nitric acid, and in this case, the acid catalyst may be added in an amount such that the molar ratio of the acid catalyst to the silicon dioxide in the second water glass solution becomes 1 to 3.

Step 3) according to an embodiment of the present invention is a step of forming a second silica wet gel, and may be performed by adding a surface modifier solution to the solution in which the first silica wet gel is dispersed and causing a reaction.

The surface modifier solution may be produced by adding the surface modifier to a nonpolar organic solvent and then mixing. In this case, the concentration of the surface modifier in the surface modifier solution may be 0.1 to 4M. That is, the surface modifier solution may be produced by adding 0.1-0.4M of the surface modifier to the nonpolar organic solvent and then mixing.

The surface modifier may be at least one selected from the group consisting of trimethylchlorosilane (TMCS), hexamethyldisilazane (HMDS), methyltrimethoxysilane, trimethylethoxysilane, ethyltriethoxysilane, and phenyltriethoxysilane, and more specifically, may be hexamethyldisilazane (HMDS).

The nonpolar organic solvent may be at least one selected from the group consisting of hexane, heptane, toluene and xylene.

In addition, the surface modifier solution may be added in an amount such that the molar ratio of the surface modifier to the silicon dioxide in the first water glass solution becomes 0.05 to 20, more specifically 0.5 to 5. When the surface modifier solution is added in an amount such that the molar ratio is less than 0.05, the amount of the surface modifier capable of reacting with a silanol group (Si—OH) is relatively smaller than that of the silanol group (Si—OH) in the water glass solution, thereby causing the surface modification reactivity to be lowered and making surface modification not be readily performed. Therefore, the silanol group which is not surface-modified during drying involves in a condensation reaction, so that the pore size of the finally produced silica aerogel may become small, and a porous structure may not be achieved. In addition, when the surface modifier solution is added in an amount such that the molar ratio is more than 20, there exists a large amount of residual surface modifiers not participating in the surface modification reaction, so that expensive surface modifier may be wasted and economical efficiency may thus be poor.

Meanwhile, step 2) and step 3) according to an embodiment of the present invention may be performed simultaneously or sequentially. That is, the second water glass solution, the acid catalyst and the surface modifier solution may be simultaneously added to the reactor; alternatively, the second water glass solution and the acid catalyst may be added to the reactor, followed by addition of the surface modifier solution.

More specifically, however, the surface modifier solution may be added at a time when the internal temperature of the reactor reaches 25 to 95° C. after the second water glass solution and the acid catalyst are added to the reactor.

When the second water glass solution and the acid catalyst are added to the first silica wet gel, the second water glass solution and the acid catalyst do not react with the first silica wet gel. However, when the surface modifier solution is subsequently added, the surface modifier is decomposed by the acid catalyst to generate ammonia, and pH is raised to trigger gelation. That is, the gelation of the second water glass solution starts within a few minutes after the addition of the surface modifier solution, and, from a thermodynamic perspective, it is thus more efficient to add the surface modifier solution in a state in which the internal temperature of the reactor has been raised for achieving quick gelation and surface modification.

That is, after the second water glass solution and acid catalyst are added to the reactor, the internal temperature of the reactor is raised to the above range, and then the surface modifier solution may be added to carry out a reaction. In this case, the reactor may be a reactor having a stirrer, and the reaction may be performed with stirring. The stirring is not particularly limited but may be performed at a speed of 50 rpm to 700 rpm.

In step 3) according to an embodiment of the present invention, gelation, solvent exchange, and surface modification may be performed simultaneously.

Specifically, the second water glass solution containing the acid catalyst and the surface modifier solution are mixed and reacted, so that the decomposition of the surface modifier in the surface modifier solution is activated by the acid catalyst to generate ammonia. Therefore, the pH in the reactor is raised due to the ammonia, and a basic environment may be created, which may be lead to the gelation of the second water glass solution.

In addition, the solvent exchange of the second silica wet gel may be performed by the nonpolar organic solvent included in the surface modifier solution, and at the same time, the surface modification reaction of the second silica wet gel may be promoted, and the diffusion of the surface modifier solution into the previously produced first silica wet gel may also promote the solvent exchange of the first wet gel and the surface modification reaction.

When gelation and surface modification are simultaneously performed as in the preparation of the second silica wet gel, the efficiency of the surface modification reaction is higher than that in the case in which surface modification is performed subsequently after gelation. Thus, there may be also an advantage that a silica aerogel having high hydrophobicity may be produced.

Therefore, in step 3), by using the previously produced first silica wet gel as a basic skeleton, the second silica wet gel is formed by gelation of the second water glass solution. At the same time, solvent exchange and surface modification may be performed to form a hydrophobic silica wet gel having a structure in which the second silica wet gel is organically bonded to the first silica wet gel which serves as the basic skeleton.

As such, according to the production method of the present invention, the structure of the silica wet gel is formed through a plurality of steps, so that mechanical properties are further enhanced compared with that of the case of forming the structure of the silica wet gel at a time.

Meanwhile, the production method of the present invention may further include a step of adding ammonium hydroxide during step 3) in order to further promote the galation and the surface modification reaction.

Specifically, the ammonium hydroxide may be added after the total amount of the surface modifier solution used in the reaction is added to the reactor, and more specifically, the ammonium hydroxide may be involved in the reaction by being added at a time when the pH in the reactor reaches 5 to 10 after the total amount of the surface modifier solution is added to the reactor, or may be involved in the reaction by being added after the solvent exchange is completed.

In this case, the time when the pH reaches the above range may vary with the concentration of silicon dioxide in the second water glass solution. For example, when the concentration of silicon dioxide in the second water glass solution is 1.5 to 2.5 wt %, the time may be 30±3 minutes just after the total amount of the surface modifier solution is added to the reactor.

In addition, the time when the solvent exchange is completed indicates a time when the liquid which fills pores in the silica wet gel is exchanged with an organic solvent used in water, and may be observed from whether the silica wet gel is dispersed or not when the silica wet gel generated during the reaction is extracted and placed into a water phase or an organic solvent phase.

In addition, the added amount of the ammonium hydroxide is not particularly limited as long as the gelation and the surface modification reaction may be readily carried out without causing problems due to other additional reactions. However, for example, the ammonium hydroxide may be added in an amount such that the pH in the reactor after the addition of ammonium hydroxide is increased by 5% to 57% of the pH in the reactor before the addition thereof. For instance, when the pH in the reactor before the addition of the ammonium hydroxide is 7, the ammonium hydroxide may be added in an amount such that the pH in the reactor becomes 7.35 to 11.

Specifically, the ammonium hydroxide may be added, within an amount adjustable to meet the pH range above, in an amount such that the molar ratio of the ammonium hydroxide to the silicon dioxide in the first water glass solution becomes 0.5 to 25.

As described above, the production method according to an embodiment of the present invention may improve the surface modification reaction by further adding ammonium hydroxide during the reaction of step 3) and involving in the reaction. Thus, the silica aerogel having high hydrophobicity may be produced without using a large amount of the expensive surface modifier.

In step 4) according to an embodiment of the present invention, a step of drying a silica wet gel containing the first silica wet gel and the second silica wet gel may be performed in order to form a silica aerogel.

In this case, the production method according to an embodiment of the present invention may further include performing a washing step before the drying step. The washing, which is for removing impurities (sodium ions, unreacted substances, by-products, etc.) generated during the reaction to obtain a hydrophobic silica aerogel with high purity, may be performed through a dilution process or an exchange process using a nonpolar organic solvent.

Specifically, the dilution process may indicate a solvent dilution process, and may be a process in which a nonpolar organic solvent may be further added to the reactor after the surface modification reaction of step 3) to allow the excessive amount of the nonpolar organic solvent to be present in the reactor. In addition, the exchange process may indicate a solvent exchange process, and may be a process in which steps of discharging an aqueous solution layer in the reactor after the surface modification reaction of step 3), then introducing the nonpolar organic solvent, and discharging again the separated aqueous solution layer are repeatedly performed.

More specifically, the production method according to an embodiment of the present invention may be performed by additionally adding the nonpolar organic solvent to the silica wet gel containing the first silica wet gel and the second silica wet gel, and then stirring the mixture for 20 minutes to 1 hour.

The drying step in the production method according to an embodiment of the present invention may be performed by a supercritical drying process or an ambient drying process, and more specifically, may be performed by using the ambient drying process under the conditions of a temperature of 100 to 190° C. for 1 hour to 4 hours.

Thus, the production method according to an embodiment of the present invention is advantageous in that there is no need of an expensive high-pressure apparatus, and drying may thus be performed for a shorter time within 6 hours at a lower production cost than as in case of using the conventional supercritical process, thereby improving the productivity and economical efficiency of the silica aerogel.

The ambient drying process may be disadvantageous in that the pore structure is easily shrunk and cracked due to a high capillary force and a difference in solvent extraction speed. However, the silica aerogel produced by the production method of the present invention may have particularly enhanced mechanical properties, and thus the wet gel may be dried without shrinkage while maintaining the structure of the wet gel without any change. Accordingly, there is a significance in that the disadvantage of the ambient drying process may be solved and the predictability of the tap density of the finally produced silica aerogel is high.

In addition, the present invention provides a hydrophobic silica aerogel produced by the production method.

The hydrophobic silica aerogel according to an embodiment of the present invention may have a tap density of 0.03 to 0.10 g/ml, more specifically 0.04 to 0.08 g/ml. Thus, the tap density of the finally produced silica aerogel is predictable so that the silica aerogel having the intended specific tap density may be produced.

As described above, in the method for producing a silica aerogel according to an embodiment of the present invention, the first silica wet gel is first produced by using the first water glass solution, and then the second water glass solution is additionally added to produce the second silica wet gel organically bonded to the first silica wet gel which serves as a basic skeleton. Resultantly, a silica aerogel with enhanced mechanical properties is formed to improve the resistance to shrinkage in ambient drying. Also, when the first and second water glass solutions are used such that the concentrations thereof are adjusted to specific concentration ranges, there is an effect in that the density may be controlled so as to produce a silica aerogel having a specific tap density. Therefore, this method is expected to be widely used in the related industrial fields.

Hereinafter, examples of the present invention will be described in detail so that those skilled in the art can easily carry out the present invention. The present invention may, however, be embodied in many different forms and is not limited to the examples set forth herein.

Example 1

A first water glass solution (12.5 g of water glass) in an amount of 4 wt % (a silicon dioxide content) and 1.5 ml of an acetic acid were put into a reactor, and were gelled to form a silica wet gel, and then the first silica wet gel was aged in an oven at 50° C. Thereafter, the first silica wet gel was pulverized by using a pulverizer to prepare a first silica wet gel slurry.

1 wt % of a second water glass solution (3.5 g of water glass) and 10 g of nitric acid were added to the first silica wet gel slurry, and the temperature was maintained while being stirred in the reactor at 55° C.

Thereafter, a surface modifier solution obtained by adding and stirring 23 g of hexamethyldisilazane (HMDS) to 200 ml of n-hexane is added to carry out a reaction for preparing a second silica wet gel. After initiation of the reaction, the silica wet gel in an aqueous solution layer was surface-modified and floated onto the top of the organic solvent layer of n-hexane. Then, in order to adjust the degree of surface modification, 3 ml of ammonium hydroxide was added at 30 minutes after the addition of surface modifier solution. When the surface modification was completed and a hydrophobic silica wet gel was completely floated onto the organic solvent layer of the n-hexane, 200 ml of n-hexane was further added, and then the aqueous solution layer remaining in the lower portion of the reactor was discharged through an outlet of the reactor. After 2 hours, the silica wet gel dispersed in an n-hexane layer was completely dried in a forced convection oven at 150° C. for 6 hours to produce a hydrophobic silica aerogel.

Examples 2 to 15

Silica aerogels were produced in the same manner as in Example 1, except that first and second water glass solutions, acetic acid and nitric acid were used in respective amounts described in Table 1 below.

Comparative Examples 1 to 9

Silica aerogels were produced in the same manner as in Example 1, except that first and second water glass solutions, acetic acid and nitric acid were used in respective amounts described in Table 1 below.

Experimental Example 1: Tap Density Measurement

For comparative analysis of physical properties of hydrophobic silica aerogels produced in Examples 1 to 15 and Comparative Examples 1 to 9, the tap density (g/ml) of each aerogel was measured, and the results were shown in Table 1 below.

1) Tap Density (g/ml)

Tap density was measured by using a tap density measuring instrument (STAV II, Engelsman AG). Specifically, each of the aerogels was placed into a standardized cylinder (25 ml) and weighted, then the cylinder was fixed to the tap density measuring instrument, a noise damping hood was closed, and 2500-times tapping was set. After the tapping measurement, the volume of each aerogel in the cylinder was measured, and a ratio of the previously measured weight to the above volume was calculate to measure the density.

TABLE 1

| Classification | Formation of first silica wet gel | | Formation of second silica wet gel | | Surface modifier (g) | Tap density (g/ml) |
|---|---|---|---|---|---|---|
| | Silicon dioxide (wt %) | Acetic acid (g) | Silicon dioxide (wt %) | Nitric acid (g) | | |
| Comparative Example 1 | 2 | 1.5 | 1 | 10 | 23 | 0.055 |
| Comparative Example 2 | 2 | 1.5 | 2 | 11 | 23 | 0.060 |
| Comparative Example 3 | 2 | 1.5 | 3 | 12 | 23 | 0.061 |
| Comparative Example 4 | 3 | 2 | 1 | 10 | 23 | 0.064 |
| Comparative Example 5 | 3 | 2 | 2 | 11 | 23 | 0.072 |
| Comparative Example 6 | 3 | 2 | 3 | 12 | 23 | 0.070 |
| Example 1 | 4 | 3 | 1 | 10 | 23 | 0.032 |
| Example 2 | 4 | 3 | 2 | 11 | 23 | 0.043 |
| Example 3 | 4 | 3 | 3 | 12 | 23 | 0.048 |
| Example 4 | 5 | 3.6 | 1 | 10 | 23 | 0.047 |
| Example 5 | 5 | 3.6 | 2 | 11 | 23 | 0.051 |
| Example 6 | 5 | 3.6 | 3 | 12 | 23 | 0.049 |
| Example 7 | 6 | 4.6 | 1 | 10 | 23 | 0.053 |
| Example 8 | 6 | 4.6 | 2 | 11 | 23 | 0.059 |
| Example 9 | 6 | 4.6 | 3 | 12 | 23 | 0.069 |
| Example 10 | 7 | 5.6 | 1 | 10 | 23 | 0.062 |
| Example 11 | 7 | 5.6 | 2 | 11 | 23 | 0.072 |
| Example 12 | 7 | 5.6 | 3 | 12 | 23 | 0.078 |
| Example 13 | 8 | 5.9 | 1 | 10 | 23 | 0.070 |
| Example 14 | 8 | 5.9 | 2 | 11 | 23 | 0.079 |
| Example 15 | 8 | 5.9 | 3 | 12 | 23 | 0.084 |
| Comparative Example 7 | 9 | 6.5 | 1 | 10 | 23 | 0.110 |
| Comparative Example 8 | 9 | 6.5 | 2 | 11 | 23 | 0.128 |
| Comparative Example 9 | 9 | 6.5 | 3 | 12 | 23 | 0.111 |

As shown in Table 1 and FIG. 1, it may be ascertained that there is a linear relationship between the tap density of hydrophobic silica aerogels of Examples 1 to 15 produced by the production method according to an embodiment of the present invention and the concentration of silicon dioxide in each of the used first and second water glass solutions.

On the contrary, in the case of the hydrophobic silica aerogels of Comparative Examples 1 to 9 in which the concentration of silicon dioxide in each of the first and second water glass solutions falls outside the specific range set forth in the present invention, it may be ascertained that there is no linear relationship between the tap density of the hydrophobic silica aerogel and the concentration of silicon dioxide in each of the used first and second water glass solutions.

The above results demonstrates the effect of enhancing the mechanical properties of the silica aerogel produced by the production method of the present invention and the effect of adjusting the concentration of the first and second water glass solutions in the specific range to be used. The production method of the present invention proves that the tap density of the finally produced silica aerogel may be predicted, and the silica aerogel according to the desired specific tap density may be produced.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for producing a silica aerogel, comprising:
   1) adding a first water glass solution and an acid catalyst to a reactor to form a first silica wet gel;
   2) adding a second water glass solution and an acid catalyst to the first silica wet gel;
   3) adding a surface modifier solution to the first silica wet gel to form a second silica wet gel; and
   4) drying a silica wet gel including the first silica wet gel and the second silica wet gel,
   wherein the concentration of silicon dioxide in the first water glass solution is 3.5 to 8.5 wt %, and the concentration of silicon dioxide in the second water glass solution is 0.5 to 3.5 wt %.

2. The method of claim 1, wherein the concentration ratio of the silicon dioxide in the first water glass solution to the silicon dioxide in the second water glass solution is 1:1 to 10:1.

3. The method of claim 1, wherein the silica aerogel has a tap density of 0.03 to 0.10 g/ml.

4. The method of claim 1, wherein the acid catalyst is at least one selected from the group consisting of hydrochloric acid, nitric acid, acetic acid, sulfuric acid and hydrofluoric acid.

5. The method of claim 1, further comprising, after step 1), aging and pulverizing the first wet gel.

6. The method of claim 1, wherein the surface modifier solution is a solution in which a surface modifier is added to a nonpolar organic solvent.

7. The method of claim 1, wherein the surface modifier is at least one selected from the group consisting of trimethylchlorosilane (TMCS), hexamethyldisilazane (HMDS), methyltrimethoxysilane, trimethylethoxysilane, ethyltriethoxysilane, and phenyltriethoxysilane.

8. The method of claim 1, wherein the nonpolar organic solvent is at least one selected from the group consisting of hexane, heptane, toluene, and xylene.

9. The method of claim 1, wherein the surface modifier solution is added in an amount such that a molar ratio of a surface modifier to the silicon dioxide in the first water glass solution becomes 0.05 to 20.

10. The method of claim 1, wherein gelation, solvent exchange, and surface modification are simultaneously performed in step 3).

11. The method of claim 1, wherein the second silica wet gel is organically bonded to the first silica wet gel which serves as a basic skeleton.

12. The method of claim 1 further comprising, during step 3), a step of adding ammonium hydroxide ($NH_4OH$).

13. The method of claim 12, wherein the ammonium hydroxide is added in an amount such that a molar ratio of the ammonium hydroxide to the silicon dioxide in the first water glass solution becomes 0.5 to 25.

\* \* \* \* \*